US005290603A

United States Patent [19]

Nielsen et al.

[11] Patent Number: 5,290,603

[45] Date of Patent: Mar. 1, 1994

[54] METHOD FOR SPRAYING POLYMERIC COMPOSITIONS WITH REDUCED SOLVENT EMISSION AND ENHANCED ATOMIZATION

[75] Inventors: Kenneth A. Nielsen, Charleston; David C. Busby, both of Charleston, W. Va.; Marc D. Donohue, Ellicott City, Md.; Charles W. Glancy, South Charleston, W. Va.

[73] Assignee: Union Carbide Chemicals & Plastics Technology Corporation, Danbury, Conn.

[21] Appl. No.: 993,319

[22] Filed: Dec. 18, 1992

[51] Int. Cl.[5] .............................................. B05D 1/02

[52] U.S. Cl. .................................... 427/421; 427/422

[58] Field of Search ............... 427/421, 422, 426, 384, 427/385.5; 118/300, 302

[56] References Cited

U.S. PATENT DOCUMENTS

| | | | |
|---|---|---|---|
| 4,582,731 | 4/1986 | Smithy | 427/421 |
| 4,734,227 | 3/1988 | Smith | 264/13 |
| 4,734,451 | 3/1988 | Smith | 524/493 |
| 4,923,720 | 5/1990 | Lee et al. | 427/422 |
| 5,009,367 | 4/1991 | Nielsen | 239/3 |
| 5,057,342 | 10/1991 | Hoy et al. | 427/422 |

*Primary Examiner*—Shrive Beck
*Assistant Examiner*—David M. Maiorana
*Attorney, Agent, or Firm*—J. F. Leightner

[57] ABSTRACT

Methods are presented by which polymeric compositions, such as coating compositions, can be sprayed with compressed fluids, such as carbon dioxide, nitrous oxide, or ethane, at higher solids levels and with finer atomization to give improved spray application quality with reduced emission of solvent.

20 Claims, 7 Drawing Sheets

METHOD FOR SPRAYING POLYMERIC COMPOSITIONS WITH REDUCED SOLVENT EMISSION AND ENHANCED ATOMIZATION

FIELD OF THE INVENTION

This invention, in general, pertains to the field of spraying polymeric compositions with reduced emission of volatile organic solvent. More particularly, the present invention is directed to methods for spraying polymeric compositions using supercritical fluids or subcritical compressed fluids, such as carbon dioxide, under conditions that give enhanced atomization.

BACKGROUND OF THE INVENTION

Many industrial processes spray compositions that contain viscous or solid polymeric components, such as coatings, adhesives, release agents, additives, gel coats, lubricants, and agricultural materials. To spray such materials, it has been common practice to use relatively large amounts of organic solvents. The solvents perform a variety of functions, such as to dissolve the polymers; to reduce viscosity for spraying; to provide a carrier medium for dispersions; and to give proper flow when the composition is sprayed onto a substrate, such as coalescence and leveling to form a smooth coherent coating film. However, the solvents released by the spray operation are a major source of air pollution.

There are several patents which disclose new spray technology that can markedly reduce organic solvent emissions, by using environmentally acceptable supercritical fluids or subcritical compressed fluids, such as carbon dioxide, to replace the solvent fraction in solvent-borne Compositions that is needed to obtain low spray viscosity: U.S. Pat. Nos. 4,923,720 and 5,108,799 disclose methods for using supercritical fluids for the spray application of coatings. U.S. Pat. No. 5,106,650 discloses methods for using supercritical carbon dioxide for the electrostatic spray application of coatings. U.S. Pat. No. 5,009,367 discloses methods for using supercritical fluids for obtaining wider airless sprays. U.S. Pat. No. 5,057,342 discloses methods for using supercritical fluids for obtaining feathered airless sprays. U.S. Pat. No. 4,882,107 discloses methods for using supercritical fluids to apply mold release agents, such as in the production of polyurethane foam. U.S. Pat. No. 5,066,522 discloses methods for using supercritical fluids to apply adhesive coatings.

Smith, in U.S. Pat. No. 4,582,731, issued Apr. 15, 1986; U.S. Pat. No. 4,734,227, issued Mar. 29, 1988; and U.S. Pat. 4,734,451, issued Mar. 29, 1988; discloses methods for the deposition of thin films and the formation of powder coatings through the molecular spray of solutes dissolved in supercritical fluid solvents, which may contain organic solvents. The concentration of said solutes are described as being quite dilute; on the order of 0.1 percent by weight. In conventional spray applications, the solute concentration is normally 50 times or more greater than this level.

The molecular sprays disclosed in the Smith patents are defined as a spray "of individual molecules (atoms) or very small cluster of solute" which are in the order of about 30 Angstroms in diameter. These "droplets" are more than $10^6$ to $10^9$ less massive than the droplets formed in conventional methods that Smith refers to as "liquid spray" applications.

The conventional atomization mechanism of airless sprays is well known and is discussed and illustrated by Dombroski, N., and Johns, W. R., *Chemical Engineering Science* 18: 203, 1963. The coating exits the orifice as a liquid film that becomes unstable from shear induced by its high velocity relative to the surrounding air. Waves grow in the liquid film, become unstable, and break up into liquid filaments that likewise become unstable and break up into droplets. Atomization occurs because cohesion and surface tension forces, which hold the liquid together, are overcome by shear and fluid inertia forces, which break it apart. However, viscous dissipation markedly reduces atomization energy, so relatively coarse atomization typically results. Liquid-film sprays are angular in shape and have a fan width that is about the fan width rating of the spray tip. They characteristically form a "tailing" or "fishtail" spray pattern, wherein coating material is distributed unevenly in the spray. Surface tension often gathers more liquid at the edges of the spray fan than in the center, which can produce coarsely atomized jets of coating that sometimes separate from the spray. As used herein, the phrases "liquid-film atomization" and "liquid-film spray" are understood to mean a spray, spray fan, or spray pattern in which atomization occurs by this conventional mechanism.

As disclosed in the aforementioned related patents, supercritical fluids or subcritical compressed fluids such as carbon dioxide are not only effective viscosity reducers, they can produce a new airless spray atomization mechanism, which can produce finer droplet size than by conventional airless spray methods and a feathered spray needed to apply high quality coatings. Without wishing to be bound by theory, the new type of atomization is believed to be produced by the dissolved carbon dioxide suddenly becoming exceedingly supersaturated as the spray mixture enters the spray orifice and experiences a sudden and large drop in pressure. This creates a very large driving force for gasification of the carbon dioxide, which overwhelms the cohesion, surface tension, and viscosity forces that oppose atomization and normally bind the fluid flow together.

A different atomization mechanism is evident because atomization appears to occur right at the spray orifice instead of away from it. Atomization is believed to be due not to break-up of a liquid film from shear with the surrounding air but, instead, to the force of the expanding carbon dioxide gas. Therefore, no liquid film is visible coming out of the nozzle. Furthermore, because the spray is no longer bound by cohesion and surface tension forces, it leaves the nozzle at a much wider angle than normal airless sprays and produces a "feathered" spray with tapered edges like an air spray. This produces a rounded, parabolic-shaped spray fan instead of the sharp angular fans typical of conventional airless sprays. The spray also typically has a much wider fan width than conventional airless sprays produced by the same spray tip. As used herein, the phrases "decompressive atomization" and "decompressive spray" are understood to mean to a spray, spray fan, or spray pattern that has the preceding characteristics.

Generally, the preferred upper limit of supercritical fluid addition is that which is capable of being miscible with the polymeric coating composition. This practical upper limit is generally recognizable when the admixture containing coating composition and supercritical fluid breaks down from one phase into two fluid phases. To better understand this phenomenon, reference is made to the phase diagram in FIG. 1, wherein the supercritical fluid is carbon dioxide. The vertices of the triangular diagram represent the pure components of a coating formulation admixed with carbon dioxide, which for the purpose of this discussion contains no water. Vertex A is solvent, vertex B is carbon dioxide, and vertex C represents a polymeric material. In this diagram, the polymer and the solvent are completely miscible in all proportions and the carbon dioxide and the solvent are likewise completely miscible in all portions, but the carbon dioxide and the polymer are not miscible in any portion, because the carbon dioxide is a non-solvent for the polymer. The curved line BFC represents the phase boundary between one phase and two phases. The point D represents a possible coating composition to which carbon dioxide has not been added. The point E represents a possible composition of a coating formulation admixture after addition of supercritical carbon dioxide. The added supercritical carbon dioxide is fully dissolved and has reduced the viscosity of the viscous coating composition to a range where it can be readily atomized by passing it through an orifice such as in an airless spray gun. After atomization, the carbon dioxide vaporizes, leaving substantially the composition of the original viscous coating composition. Upon contacting the substrate, the liquid mixture of polymer and solvent coalesces to produce a smooth coating film on the substrate. The film forming pathway is illustrated in FIG. 1 by the line segments EE'D (atomization and decompression) and DC (coalescence and film formation).

Although the supercritical fluid spray methods have been successful, one difficult problem that is created is that the reformulated polymeric composition, which is called a concentrate, has increasingly higher viscosity as higher levels of solvent are removed to further reduce solvent emissions. Concentrate viscosities typically increase from a conventional viscosity of about 100 centipoise to about 800 to 5000 centipoise or higher as more solvent is removed. Therefore, obtaining fine atomization becomes increasingly more difficult. This limits the amount of solvent that can be removed and hence the solids level that can be used in the concentrate. The poorer atomization gives poorer spray application quality such as poorer coatings. Therefore a need clearly exists for methods by which atomization can be enhanced when using supercritical fluids or subcritical compressed fluids to spray polymeric compositions in order to reach higher solids levels and to obtain finer atomization to obtain improved spray application quality.

SUMMARY OF THE INVENTION

By virtue of the present invention, methods have been discovered that are indeed able to accomplish the above noted objectives. Polymeric compositions can be sprayed with supercritical or subcritical compressed fluids such as carbon dioxide, nitrous oxide, or ethane at higher solids levels and with finer atomization to give improved spray application quality with reduced emission of solvent.

In its broadest embodiment, the present invention is directed to a process for spraying a polymeric composition to form a spray of finely atomized liquid droplets, which comprises:

(1) forming a liquid mixture at temperature $T^0$ in a closed system, said mixture comprising:

(a) a nonvolatile materials fraction containing at least one polymeric compound and which is capable of being sprayed; and (b) a solvent fraction which is at least partially miscible with the nonvolatile materials fraction and contains at least one compressed fluid in an amount which when added to (a) is sufficient:

(i) to render the viscosity of said mixture to a point suitable for being sprayed; and (ii) to enable said liquid mixture to form a liquid compressed fluid phase at temperature $T^0$; wherein the compressed fluid is a gas at standard conditions of 0° C. and one atmosphere pressure (STP); and (2) spraying said liquid mixture by passing the mixture at temperature $T^0$ and spray pressure $P_1$ into an orifice through which said mixture flows to form a liquid spray, wherein spray pressure $P_1$ is above the minimum pressure $P_2$ at which said liquid mixture forms a liquid compressed fluid phase at temperature $T^0$.

In a preferred embodiment, the spray pressure $P_1$ is above or just below the maximum pressure $P_3$ at which said mixture forms a liquid compressed fluid phase at temperature $T^0$.

In another preferred embodiment, the solvent fraction additionally contains at least one active solvent for the polymeric compound.

In yet another preferred embodiment, the compressed fluid is a supercritical fluid at temperature $T^0$ and spray pressure $P_1$.

In still another preferred embodiment, the compressed fluid is carbon dioxide, nitrous oxide, ethane, or a mixture thereof.

In another embodiment, the present invention is directed to a process for the spray application of polymeric coating compositions to a substrate, which comprises:

(1) forming a liquid mixture at temperature T=in a closed system, said mixture comprising:

(a) a nonvolatile materials fraction containing at least one polymeric compound capable of forming a coating on a substrate; and (b) a solvent fraction which is at least partially miscible with the nonvolatile materials fraction and contains at least one compressed fluid in an amount which when added to (a) is sufficient:

(i) to render the viscosity of said mixture to a point suitable for being sprayed; and (ii) to enable said liquid mixture to form a liquid compressed fluid phase at temperature $T^0$; wherein the compressed fluid is a gas at standard conditions of 0° C. and one atmosphere pressure (STP); and (2) spraying said liquid mixture onto a substrate to form a coating thereon by passing the mixture at temperature $T^0$ and spray pressure P into an orifice through which said mixture flows to form a liquid spray, wherein spray pressure $P_1$ is above the minimum pressure $P_2$ at which said liquid mixture forms a liquid compressed fluid phase at temperature $T^0$.

Here again, in a preferred embodiment, the spray pressure $P_1$ is above or just below the maximum pressure $P_3$ at which said mixture forms a liquid compressed fluid phase at temperature $T^0$.

In another preferred embodiment, the solvent fraction additionally contains at least one active solvent for the polymeric compound.

DETAILED DESCRIPTION OF THE INVENTION

Figure 1:
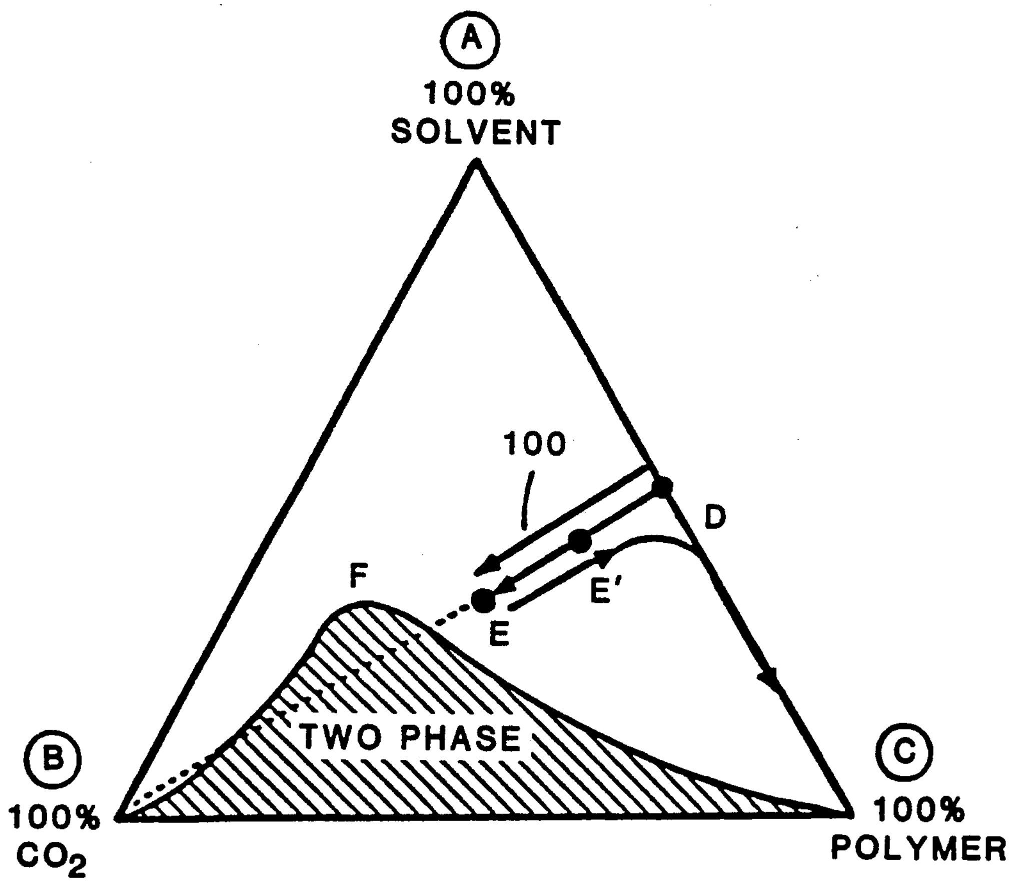
FIG. 1 is a triangular phase diagram for admixtures of a polymeric coating composition and supercritical carbon dioxide.

It has been found that, by using the methods of the present invention, polymeric compositions can be sprayed with compressed fluids such as carbon dioxide, nitrous oxide, and ethane under conditions that enhance atomization. This allows the polymeric compositions to be sprayed at higher solids levels and with finer atomization, which gives improved spray application quality and reduced emission of solvent. The methods are particularly applicable to the spray application of coatings to a substrate.

As used herein, it will be understood that a "compressed fluid" is a fluid which may be in its gaseous state, its liquid state, or a combination thereof, or is a supercritical fluid, depending upon (i) the particular temperature and pressure to which it is subjected, (ii) the vapor pressure of the fluid at that particular temperature, and (iii) the critical temperature and critical pressure of the fluid, but which is in its gaseous state at standard conditions of 0° Celsius temperature and one atmosphere absolute pressure (STP). As used herein, a "supercritical fluid" is a fluid that is at a temperature and pressure such that it is at, above, or slightly below its critical point.

Compounds which may be used as compressed fluids in the present invention include but are not limited to carbon dioxide, nitrous oxide, ammonia, xenon, ethane, ethylene, propane, propylene, butane, isobutane, chlorotrifluoromethane, monofluoromethane, and mixtures thereof.

Preferably, the compressed fluid has appreciable solubility in the polymeric composition and is environmentally compatible, can be made environmentally compatible by treatment, such as by thermal decomposition or incineration, or can be readily recovered from the spray environment, such as by absorption or adsorption. The utility of any of the above-mentioned compressed fluids in the practice of the present invention will depend upon the polymeric composition used, the temperature and pressure of application, and the inertness and stability of the compressed fluid.

Due to environmental compatibility, low toxicity, and high solubility, carbon dioxide, ethane, and nitrous oxide are preferred compressed fluids in the present invention. Due to low cost, non-flammability, stability, and wide availability, carbon dioxide is the most preferred compressed fluid. However, use of any of the aforementioned compounds and mixtures thereof are to be considered within the scope of the present invention.

As used herein, the phrase "polymeric composition" is understood to mean conventional polymeric compositions, materials, and formulations that have no compressed fluid admixed therewith. As also used herein, the phrases "coating composition", "coating material", and "coating formulation" are understood to mean liquid compositions comprising conventional coating compositions, materials, and formulations that have no compressed fluid admixed therewith.

As used herein, the term "solvent" is understood to mean conventional solvents that have no compressed fluid admixed therewith and which are in the liquid state at conditions of about 25° C. temperature and one atmosphere absolute pressure. As used herein, the phrase "active solvent" is understood to mean any solvent or mixture of solvents that is miscible with the compressed fluid and is a good solvent for the polymeric compound.

The polymeric compositions that may be used with the present invention are generally comprised of a nonvolatile materials portion containing at least one polymeric compound and which is capable of being sprayed. The polymeric compositions, in addition to the nonvolatile materials portion, may also contain a solvent portion which is at least partially miscible with the nonvolatile materials portion. As used herein, the phrase "nonvolatile materials" is understood to mean solid materials and liquid materials such as solid polymers, liquid polymers, and other compounds that are nonvolatile at a temperature of about 25° Celsius. In general, the nonvolatile materials portion is the portion of the polymeric composition that remains after the solvent portion, if any, has evaporated from the polymeric composition. Examples of polymeric compositions that may be used include coating compositions, adhesives, release agents, additive formulations, gel coats, lubricants, non-aqueous detergents, and other compositions containing polymers, which are capable of being sprayed when admixed with compressed fluid. The polymeric compositions that may be used include liquid compositions that are conventionally sprayed using solvents and in which it is desired to reduce or eliminate the solvent content used for spraying. Also included are polymeric compositions which heretofore could not be sprayed, or could not be sprayed well, because the application or product requires that either no solvent or just a low level of solvent be present in the spray, with the maximum permitted solvent level being too low to obtain sufficiently low viscosity to achieve good atomization of the composition or to obtain a well-formed spray. The polymeric composition may comprise a liquid polymer system that may contain other nonvolatile materials but which has no solvent, or a very low level of solvent.

Polymeric compositions that may be used as polymeric coating compositions with the present invention typically include a nonvolatile materials portion containing at least one polymeric compound which is capable of forming a coating on a substrate, whether such component is a paint, enamel, lacquer, varnish, adhesive, chemical agent, release agent, lubricant, protective oil, non-aqueous detergent, an agricultural coating, or the like.

Generally, the nonvolatile materials used in the polymeric compositions of the present invention, such as the polymers, must be able to withstand the temperatures and pressures to which they are subjected after they are ultimately admixed with the compressed fluid. Such applicable polymers include thermoplastic polymers, thermosetting polymers, crosslinkable film forming systems, and mixtures thereof. The polymers may be liquid polymers or solid polymers and they may be dissolved in solvent.

In particular, the polymeric compounds include vinyl, acrylic, styrenic, and interpolymers of the base vinyl, acrylic, and styrenic monomers; polyesters; oil-free alkyds, alkyds, and the like; polyurethanes, two-package polyurethane, oil-modified polyurethanes and thermoplastic urethanes systems; epoxy systems; phenolic systems; cellulosic polymers such as acetate butyrate, acetate propionate, and nitrocellulose; amino polymers such as urea formaldehyde, melamine formaldehyde, and other aminoplast polymers and resins materials; natural gums and resins; silicone polymers such as polydimethylsiloxane and other polymers containing silicon; polymers containing fluorine; rubber-based adhesives including nitrile rubbers which are copolymers of unsaturated nitriles with dienes, styrene-butadiene rubbers, thermoplastic rubbers, neoprene or polychloroprene rubbers, and the like.

In addition to the polymeric compound, the nonvolatile materials portion of the polymeric composition may also comprise other materials such as waxes; nonvolatile organic compounds such as antioxidants, surfactants, ultraviolet absorbers, whiteners, and plasticizers; and nonvolatile inorganic materials such as chemical agents, polymer additives, abrasives, and glass fibers; and the like.

The nonvolatile materials portion of polymeric coating compositions, in addition to the polymeric compound, may contain conventional additives which are typically utilized in coatings. For example, pigments, pigment extenders, metallic flakes, fillers, drying agents, anti-foaming agents, anti-skinning agents, wetting agents, ultraviolet absorbers, cross-linking agents, plasticizers, and mixtures thereof, may all be utilized in the coating compositions to be used with the methods of the present invention.

In addition to the nonvolatile materials portion, a solvent portion may also be employed in the polymeric compositions. The solvent may perform a variety of functions, such as to dissolve the polymer and other components, to reduce viscosity, to give proper flow characteristics, and the like. As used herein, the solvent portion is comprised of essentially any organic solvent or non-aqueous diluent which is at least partially miscible with the nonvolatile materials portion. Preferably, the solvent portion contains at least one active solvent for the polymeric compound. The selection of a particular solvent portion for a given nonvolatile materials portion in order to form a polymeric coating composition or formulation is well known to those skilled in the art of coatings. In general, up to about 30 percent by weight of water, preferably up to about 20 percent by weight, may also be present in the solvent portion provided that a coupling solvent is also present. All such solvent portions are suitable in the present invention.

A coupling solvent is a solvent in which the nonvolatile materials such as polymers are at least partially soluble. Most importantly, however, such a coupling solvent is also at least partially miscible with water. Thus, the coupling solvent enables the miscibility of the nonvolatile materials, the solvent, and the water to the extent that a single liquid phase is desirably maintained such that the composition may optimally be sprayed and, for example, a good coating formed. The coupling solvent also enables miscilibity with compressed fluid. Coupling solvents are well known to those skilled in the art of coatings and any conventional coupling solvents which are able to meet the aforementioned characteristics are suitable for being used in the present invention. Applicable coupling solvents include, but are not limited to, ethylene glycol ethers, propylene glycol ethers, and chemical and physical combinations thereof; lactams; cyclic ureas; and the like. When water is not present in the polymeric composition, a coupling solvent is not necessary, but may still be employed.

Other solvents which may be present in typical polymeric compositions, including coating compositions and the like, and which may be utilized in the present invention include ketones such as acetone, methyl ethyl ketone, methyl isobutyl ketone, methyl amyl ketone, cyclohexanone and other aliphatic ketones; esters such as methyl acetate, ethyl acetate, and other alkyl carboxylic esters; ethers, such as methyl t-butyl ether, dibutyl ether, methyl phenyl ether and other aliphatic or alkyl aromatic ethers; glycol ethers such as ethoxy ethanol, butoxy ethanol, ethoxy 2-propanol, propoxy ethanol, butoxy 2-propanol and other glycol ethers; glycol ether esters such as butoxy ethoxy acetate, ethyl 3-ethoxy propionate and other glycol ether esters; alcohols such as methanol, ethanol, propanol, butanol, amyl alcohol and other aliphatic alcohols; aromatic hydrocarbons such as toluene, xylene, and other aromatics or mixtures of aromatic solvents; aliphatic hydrocarbons such as VM&P naphtha and mineral spirits, and other aliphatics or mixtures of aliphatics; and nitroalkanes such as 2-nitropropane.

Compressed fluids have been found to be good viscosity reducing diluents for polymeric compositions such as coating formulations, as disclosed in the aforementioned related patents. For example, consider an acrylic concentrate that has a viscosity of 1340 centipoise (25° Celsius). Adding carbon dioxide to 30 weight percent concentration reduces the viscosity to below 25 centipoise.

For spraying the polymeric composition to form a spray of finely atomized liquid droplets, the polymeric composition is first admixed with at least one compressed fluid to form a liquid mixture at temperature $T^0$ in a closed system, said mixture comprising (a) a nonvolatile materials fraction containing at least one polymeric compound and which is capable of being sprayed and (b) a solvent fraction which is at least partially miscible with the nonvolatile materials fraction and contains the at least one compressed fluid. As used herein, the phrase "nonvolatile materials fraction" is understood to comprise the nonvolatile materials portion of the polymeric composition. As used herein, the phrase "solvent fraction" is understood to comprise the at least one compressed fluid and the solvent portion of the polymeric composition, if the polymeric composition contains a solvent portion, or to comprise just the at least one compressed fluid, if the polymeric portion contains just nonvolatile materials with no solvent.

The solvent fraction contains the at least one compressed fluid in an amount which when added to the nonvolatile materials fraction is sufficient to render the viscosity of the liquid mixture to a point suitable for being sprayed. Preferably, the viscosity of the liquid mixture is less than about 200 centipoise, more preferably less than about 100 centipoise, and most preferably less than about 50 centipoise.

The solvent fraction also contains the at least one compressed fluid in an amount which when added to the nonvolatile materials fraction is sufficient to enable the liquid mixture to form a liquid compressed fluid phase at temperature $T^0$. The liquid mixture is sprayed by passing the mixture at temperature $T^0$ and spray pressure $P_1$ into an orifice through which said mixture flows to form a liquid spray, wherein spray pressure $P_1$ is above the minimum pressure $P_2$ at which said liquid mixture forms a liquid compressed fluid phase at temperature $T^0$.

When compressed fluid is admixed with a polymeric composition at a given temperature $T^0$, the number and type of phases formed depends upon the pressure and the compressed fluid concentration in the admixture. To better understand this phenomenon, reference is made to the phase diagram in FIG. 2, which illustrates the phase relationships for a typical liquid polymeric composition and compressed fluid. For these discussions of phase diagrams, the polymeric composition is understood to consist of a liquid solution containing polymer dissolved in solvent, with no dispersed nonsoluble materials therein. The phase relationships can be readily extended to polymeric compositions with dispersed nonsoluble materials, such as a pigmented polymeric coating composition comprising pigment dispersed in a clear polymeric vehicle, by considering the dispersed nonsoluble materials as comprising an additional inert phase. Polymeric compositions comprising liquid polymers with no solvent also have analogous phase relationships.

Figure 2:
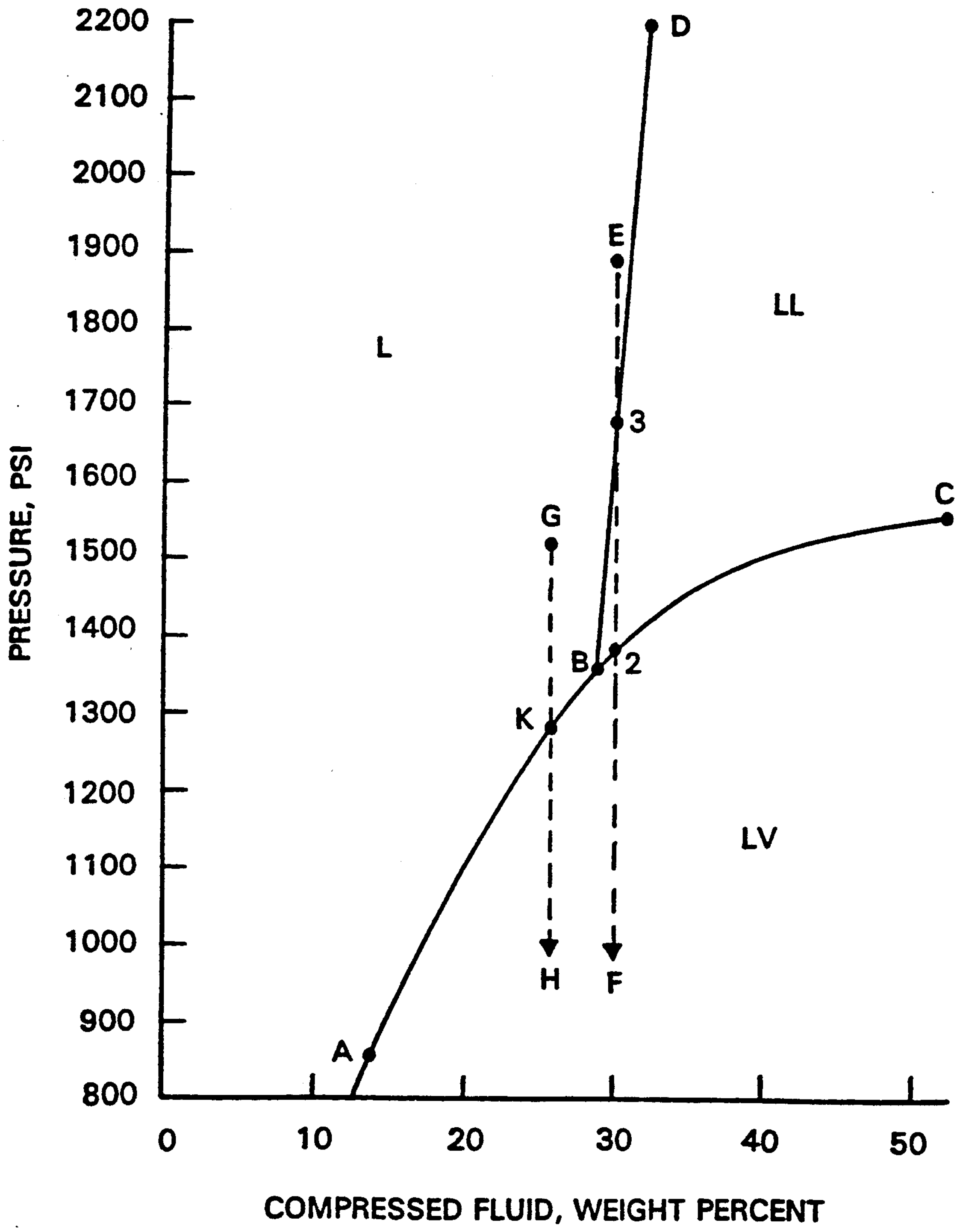
FIG. 2 is a phase diagram illustrating how phase relationships depend upon pressure and compressed fluid concentration at constant temperature.

The phase diagram illustrated in FIG. 2 at temperature $T^0$ shows a liquid region (L), a liquid-vapor region (LV), and a liquid-liquid region (LL). The solid lines border regions having the same number and types of phases, although the compositions and amounts of the phases can change with location within the regions. In the liquid region (L), the compressed fluid is completely dissolved in the polymeric composition. In the liquid-vapor region (LV), which exists at pressures below the bubble point pressure curve A-K-B-2-C, the compressed fluid is not fully dissolved in the polymeric composition; the excess forms a vapor or gaseous compressed fluid phase that is almost entirely compressed fluid and contains very little solvent vapor. A portion of the bubble point pressure curve, segment A-K-B, separates the liquid and liquid-vapor regions. The bubble point pressure is the pressure at which the first bubble of vapor or gaseous compressed fluid is formed as the pressure is lowered from high pressure, at a given compressed fluid level and temperature $T^0$. The bubble point pressure generally increases with compressed fluid concentration, but asymptotically approaches a limiting bubble point pressure as the compressed fluid concentration approaches 100%.

The liquid-liquid region (LL) is formed at pressures above the bubble point curve segment B-2-C as the compressed fluid concentration is increased above the solubility limit curve B-3-D. We have discovered that two types of liquid-liquid regions can be formed. The type required for the present invention consists of a liquid polymeric phase and a liquid compressed fluid phase. The liquid polymeric phase is substantially the polymeric composition saturated with dissolved compressed fluid. The liquid compressed fluid phase is primarily compressed fluid, but it can contain appreciable amounts of solvent extracted from the liquid polymeric phase. It usually contains relatively little polymer, because the compressed fluid is a non-solvent or very poor solvent for the polymers.

Segment B-2-C of the bubble point pressure curve borders the low pressure end of the liquid-liquid region. A relatively narrow liquid-liquid-vapor (LLV) region lies just below it, which is generally not shown because it is narrow. In the LLV region, the excess compressed fluid not dissolved in the liquid polymeric phase forms both a liquid compressed fluid phase and a gaseous compressed fluid phase. As the pressure is lowered within the LLV region, the liquid compressed fluid is converted to gaseous compressed fluid.

Point G in the liquid region (L) in FIG. 2 represents an admixture of polymeric composition and compressed fluid that is formed in a closed system at temperature $T^0$. The admixture contains sufficient compressed fluid to render the viscosity suitable for spraying and to produce a feathered spray, as disclosed in the aforementioned related patents. The admixture is sprayed by passing it under pressure through an orifice to form a liquid spray. In this illustration, the admixture contains about 27% compressed fluid and is sprayed at a pressure of 1500 psi. The dotted line G-K-H shows the path of the admixture as it undergoes rapid depressurization in the spray orifice. The admixture remains liquid until it depressurizes to the bubble point pressure at point K, at which point the dissolved compressed fluid becomes supersaturated. As the pressure drops below the bubble point pressure, the supersaturated compressed fluid nucleates to form gaseous compressed fluid, which expands as it decompresses and thereby creates an expansive force for atomization and produces a wider, feathered spray.

The solubility limit curve B-3-D that separates the liquid region (L) from the liquid-liquid region (LL), however, has been found not to be a vertical line that gives a single solubility limit concentration, that is, the points B and D do not occur at the same compressed fluid concentration. Instead, the compressed fluid solubility limit has been found to increase relatively rapidly with higher pressure, that is, point D at high pressure has a higher compressed fluid concentration than point B at low pressure.

We have discovered that enhanced atomization can be obtained, when spraying polymeric compositions, for combinations of compressed fluid concentration, spray temperature, and spray pressure for which the liquid spray mixture passes through the liquid-liquid region during depressurization. Without wishing to be bound by theory, enhanced atomization is believed to occur because the dissolved compressed fluid, during depressurization in the spray orifice, nucleates to form a liquid compressed fluid phase before forming gaseous compressed fluid, instead of nucleating directly to a gaseous compressed fluid phase. Nucleation to a liquid compressed fluid phase is much more favorable energetically than to a gas compressed fluid phase. Therefore, nucleation should occur much more quickly during depressurization, that is, at higher pressure because much less supersaturation is required, and furthermore a much higher concentration of nucleation sites should form in the decompressing fluid. These liquid nucleation sites of liquid compressed fluid readily vaporize to gaseous compressed fluid upon further depressurization, which creates an expansive force that is greater and more widely distributed in the decompressive spray than if the compressed fluid nucleated directly to fewer gas phase sites at a higher degree of supersaturation, that is, at lower pressure. This higher level and better distribution of expansive force is therefore more effective at overcoming the cohesion, surface tension, and viscosity forces that oppose atomization. Therefore, more intense atomization can occur.

A liquid mixture of polymeric composition and compressed fluid that is sprayed in conformance with the present invention is illustrated by Point E in FIG. 2. In addition to having compressed fluid in an amount sufficient to render the viscosity to a point suitable for being sprayed and to give a feathered spray, the amount of compressed fluid is sufficient to enable the liquid mixture to form a liquid compressed fluid phase at temperature $T^0$ Furthermore, the spray pressure $P_1$ of point E is above the minimum pressure $P_2$ and the maximum pressure $P_3$ at which the liquid mixture forms a liquid compressed fluid phase. Pressure $P_2$ in general is the bubble point pressure, along segment B-2-C of the bubble point pressure curve, for the compressed fluid concentration in the liquid mixture. Pressure $P_3$ in general is the solubility limit pressure, along solubility limit curve B-3-D, for the compressed fluid concentration in the liquid mixture. Therefore, during depressurization, the liquid mixture follows the path indicated by the dotted line E-3-2-F, which passes from the liquid region (L) through a portion of the liquid-liquid region (LL) before entering the liquid-vapor region (LV) at lower pressure. Therefore, the dissolved compressed fluid nucleates to form liquid compressed fluid that readily vaporizes to gaseous compressed fluid and thereby gives enhanced atomization by virtue of the higher level and better distribution of the expansive force of the gaseous compressed fluid. In this illustration, the compressed fluid concentration is about 30%, spray pressure P at point E is about 1900 psi, pressure $P_3$ at point 3 is about 1670 psi, and pressure $P_2$ at point 2 is about 1380 psi. Of course, the decompression path E-3-2-F continues until depressurization reaches ambient pressure, as indicated by the arrow at point F.

It is understood that the phase diagram in FIG. 2 illustrates the typical relationships between the phases, the bubble point pressure curve, and the solubility limit curve, but that the actual pressure and compressed fluid concentration values of the curves will depend upon the polymeric composition and compressed fluid used as well as the temperature $T^0$. It is also understood that the curve B-2-C extends to higher compressed fluid concentrations and that the curve B-3-D extends to higher pressures than shown. Such phase diagrams have been measured with carbon dioxide and ethane being the compressed fluid, with enhanced atomization being obtained by the methods of the present invention. Nitrous oxide is expected to have similar solubility and spray characteristics to carbon dioxide, because its critical temperature and pressure are nearly the same as carbon dioxide, and it has the same molecular weight and similar molecular structure.

Figure 3:
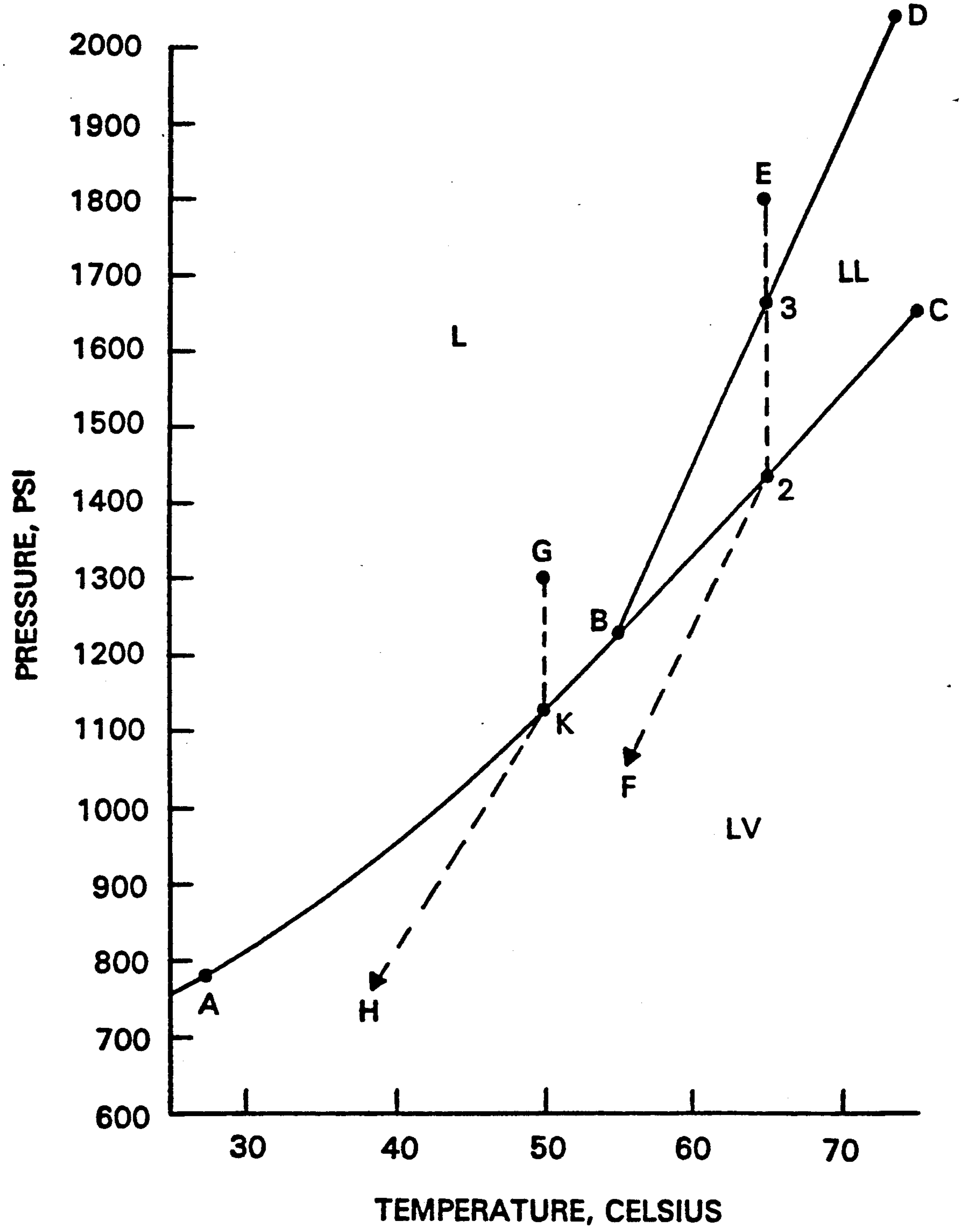
FIG. 3 is a phase diagram illustrating how phase relationships depend upon pressure and temperature at constant compressed fluid concentration.

The relationship between the phases, at a given compressed fluid concentration, can be shown as a function of temperature and pressure by using the phase diagram illustrated in FIG. 3. The liquid region (L), liquid-liquid region (LL), and liquid-vapor region (LV) correspond to those shown in FIG. 2. The curve A-K-B-2-C is the corresponding bubble point pressure curve and the curve B-3-D is the corresponding solubility limit curve. The compressed fluid concentration is sufficient to form a liquid-liquid region having a liquid compressed fluid phase at temperatures above the temperature at point B, which in this illustration is about 55° Celsius. Spray path G-K-H corresponds to the depressurization path of the admixture sprayed in accordance with the aforementioned related patents. Spray path E-3-2-F corresponds to the depressurization path of the liquid mixture of polymeric composition and compressed fluid sprayed in accordance with the present invention.

The depressurizations occur at substantially constant temperature at pressures above the bubble point pressures, that is, segments G-K and E-3-2, because liquids undergo very little expansion cooling in comparison to the expansion cooling caused by gaseous compressed fluid at pressures below the bubble point pressures. In fact, the bubble point pressure can be detected by measuring the temperature of a mixture as it depressurizes, such as in apparatus used to measure compressed fluid solubility and phase diagrams, which have been described in the aforementioned related patents. The bubble point pressure is the pressure at which the temperature first begins to drop during the decompression. Measurements show that very little, if any, cooling occurs during depressurization through the liquid-liquid region (LL) before the bubble point pressure is reached. Below the bubble point pressures, formation and expansion of the gaseous compressed fluid phase causes expansion cooling, as illustrated by segments K-H and 2-F. Of course, the depressurizations and expansion cooling continue until ambient pressure is reached, as indicated by the arrows at point H and F.

Here too, it is understood that the phase diagram in FIG. 3 illustrates the typical relationships between the phases, the bubble point pressure curve, and the solubility limit curve, but that the actual pressure and temperature values of the curves will depend upon the polymeric composition and compressed fluid used as well as the compressed fluid concentration. It is also understood that the curves B-2-C and B-3-D extend to higher pressures and temperatures than shown. In general, higher compressed fluid concentration shifts the bubble point pressure curve A-K-B-2-C to higher pressure and shifts the solubility limit curve B-3-D to lower temperature and lower pressure.

Figure 4:
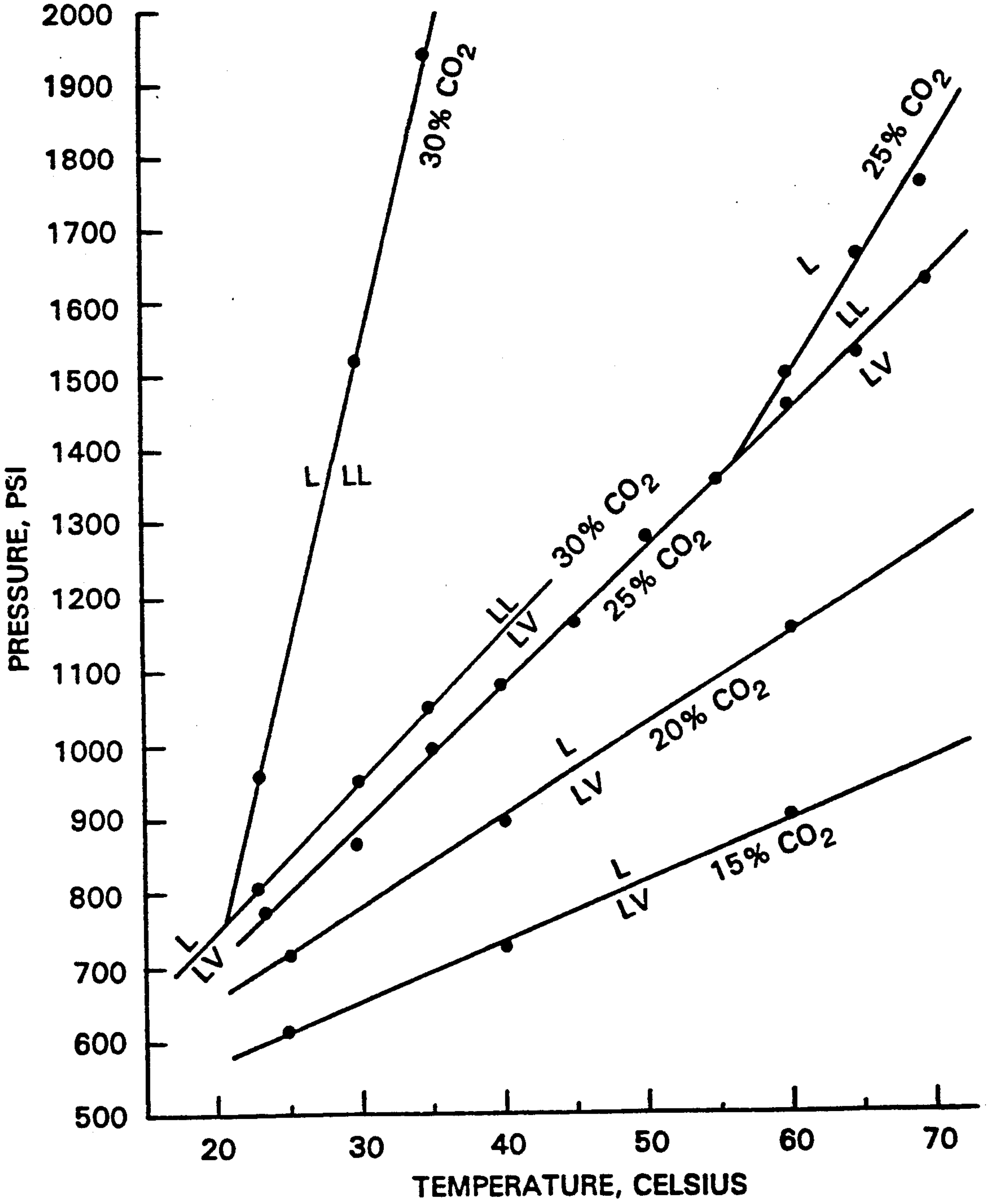
FIG. 4 is a pressure-temperature phase diagram for an acrylic polymeric composition illustrating how the phase relationships shift for 15%, 20%, 25%, and 30% carbon dioxide by weight.

A pressure-temperature phase diagram for a polymeric composition that is a thermosetting coating concentrate is shown in FIG. 4. It contains acrylic and melamine polymers at a polymer level of 78 percent by weight dissolved in a blend of methyl amyl ketone, ethyl 3-ethoxypropionate, and isobutanol solvents. The compressed fluid is carbon dioxide. The diagram shows how the phase relationships shift for 15%, 20%, 25%, and 30% carbon dioxide by weight in the liquid mixture. At 15% and 20% carbon dioxide, the liquid-liquid region (LL) is formed only at very high temperature above 70° Celsius and hence it is not shown on the diagram. At 25% carbon dioxide, there is sufficient compressed fluid to form a liquid-liquid region at temperatures $T^0$ above about 55° Celsius and at pressures above 1400 psi. At 30% carbon dioxide, the liquid-liquid region has shifted to much lower temperature and pressure, so that the liquid-liquid region is formed at temperatures $T^0$ above about 20° Celsius and at pressures above about 760 psi. This system forms a liquid carbon dioxide phase in the liquid-liquid region. Therefore, depressurization from the liquid region into the liquid-liquid region causes carbon dioxide nucleation to form a liquid carbon dioxide phase.

Figure 5:
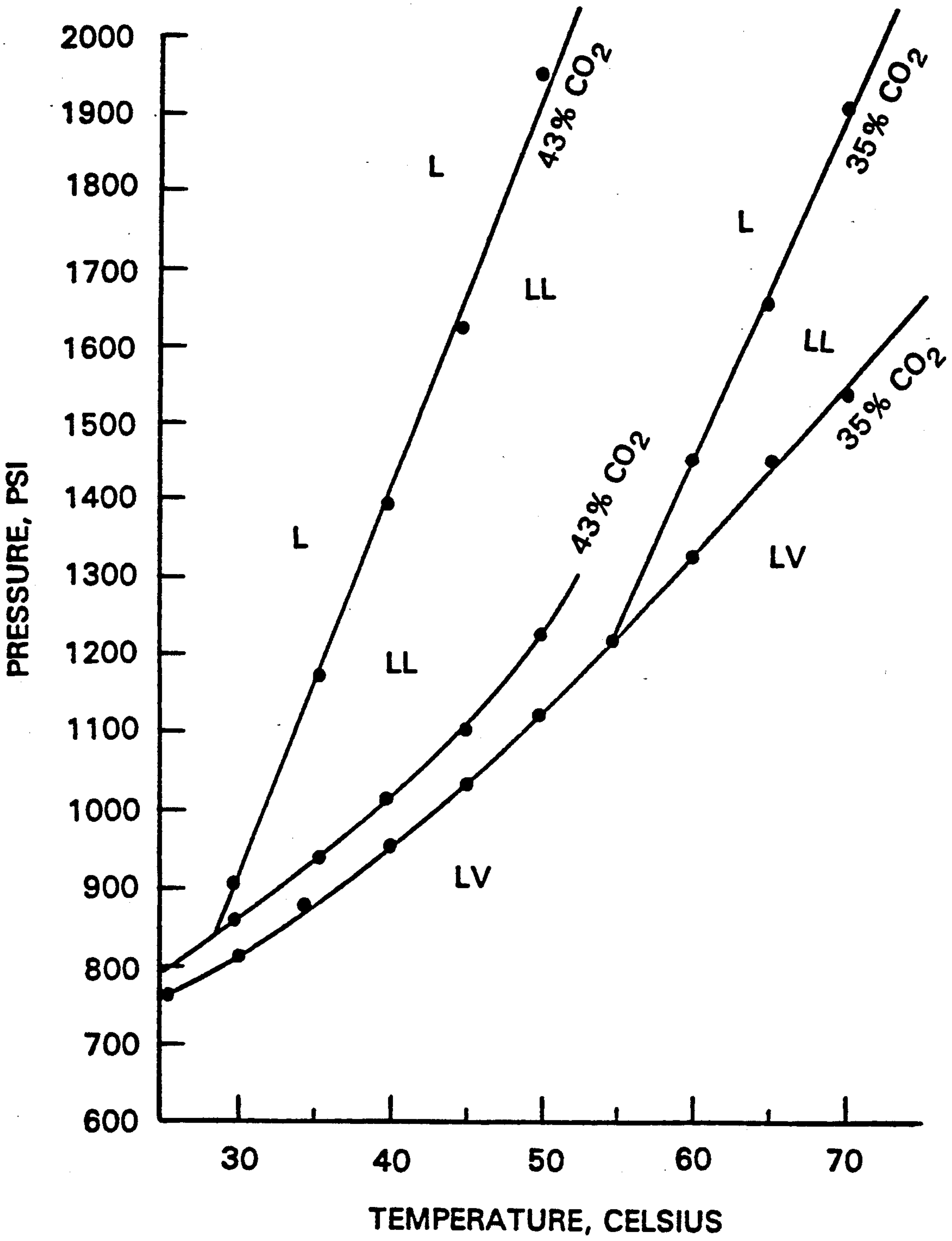
FIG. 5 is a pressure-temperature phase diagram for a polymeric coating composition illustrating the phase relationships at 35% and 43% carbon dioxide by weight.

A pressure-temperature phase diagram for a polymeric composition that is an air-dry lacquer coating concentrate is shown in FIG. 5. It contains nitrocellulose and alkyd solid polymers at a polymer level of about 38 percent by weight dissolved in a blend of methyl amyl ketone and other solvents. The compressed fluid is carbon dioxide. The diagram shows the phase relationships for 35% and 43% carbon dioxide by weight in the liquid mixture. At carbon dioxide concentrations below about 30% there is insufficient compressed fluid to form a liquid-liquid region at temperatures below about 75° Celsius. At 35% carbon dioxide, there is sufficient compressed fluid to form a liquid-liquid region at temperatures $T^0$ above about 55° Celsius and at pressures above 1200 psi. At 43% carbon dioxide, the liquid-liquid region has shifted so that the liquid-liquid region is formed at temperatures $T^0$ above about 29° Celsius and at pressures above about 840 psi. This system forms a liquid carbon dioxide phase in the liquid-liquid region.

The difference in gaseous and liquid nucleation properties obtained by depressurization across the bubble point curve and the solubility limit curve, respectively, can be visually observed in the aforementioned apparatus used to measure compressed fluid solubility and phase diagrams. Depressurization across the bubble point curve produces a mixture of fine gas bubbles dispersed in the clear liquid polymeric phase. The mixture is readily identifiable as such, because the bubbles generally are large enough and few enough to be seen individually by close examination. They also have low density, so they are very buoyant. Identifying the exact pressure at which the first bubbles are formed usually requires careful examination of the polymer solution, because the first bubbles are few and tiny. They are more easily seen as the pressure drops below the bubble point pressure, because the first bubbles formed become larger as more supersatured compressed fluid vaporizes into them. Sometimes relatively few new bubbles are formed by additional nucleation. In contrast, depressurization across the solubility limit curve, from the liquid region to the liquid-liquid region, causes the clear solution to sharply and rapidly turn opaque, obtaining the appearance of milk. Therefore, the transition is commonly referred to as the "white point". The transition is rapidly reversible with slight changes is pressure. The nucleated liquid droplets of compressed fluid are so tiny that they can not be seen individually. The mixture turns opaque because the concentration of nucleation sites is very high compared to gas phase nucleation. As the pressure is lowered further, more liquid compressed fluid is formed, and the mixture becomes a dispersion of larger droplets as the droplets grow and begin to agglomerate together. The droplets are much less buoyant than gas bubbles, but they are less dense than the polymeric phase. Therefore, as more liquid compressed fluid is formed, the droplets become large enough to be seen and to readily float upward to form a liquid level at the top of the mixture, after agitation is stopped. As the pressure is lowered, more liquid compressed fluid is formed until the the bubble point pressure is reached, at which point the liquid compressed fluid readily vaporizes into gaseous compressed fluid over a relatively narrow range of pressure.

Figure 6:
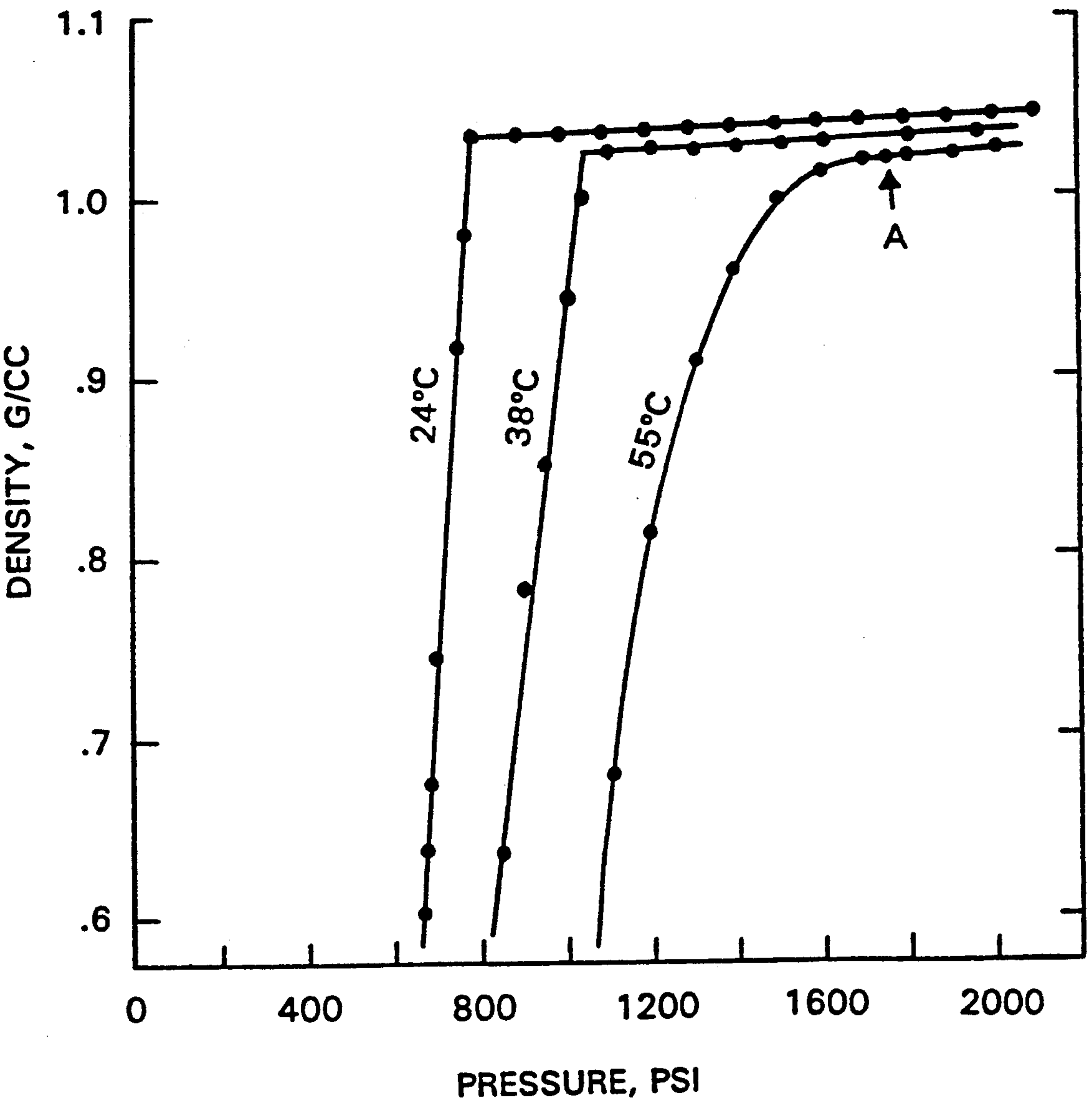
FIG. 6 is a diagram showing how the density of a mixture of an acrylic polymeric composition and 28% carbon dioxide by weight varies with pressure at temperatures of 24°, 38°, and 55° Celsius.

The difference between depressurization across the bubble point curve and the solubility limit curve can also be seen be examining how the density of the liquid mixture changes with pressure. This is shown in FIG. 6 for the thermosetting acrylic polymeric composition used in FIG. 4, with a carbon dioxide concentration of about 28 percent by weight. The density was measured by circulating the liquid mixture continuously through a sensitive densitometer. The circulation loop also contained a circulation pump, a heater to maintain constant temperature, and a piston-type accumulator, which was used to vary the pressure of the liquid mixture, by varying the pressure of compressed nitrogen fed to the accumulator. The density profile was measured at temperatures of 24°, 38°, and 55° Celsius as the liquid was depressurized from 2000 psi. At all three temperatures, the liquid mixture was essentially incompressible at pressures at which the mixture was a single liquid phase. At 24° and 38° Celsius, the density dropped suddenly and linearly with pressure after the bubble point pressure was reached and gaseous carbon dioxide was formed. In contrast, at 55° Celsius, as the mixture crossed the solubility limit at point A, a liquid carbon dioxide phase was formed which, being liquid, had a density much closer to the polymeric phase than gas. Therefore, the density dropped much more slowly with pressure as the mixture passed through the liquid-liquid region, as seen by the curvature in the density profile. Only at much lower pressure, below the bubble point pressure, did the density drop much more rapidly with pressure as gas was formed.

Therefore, that the spray pressure $P_1$ is above or within the liquid-liquid region of the phase diagram can be determined visually for clear polymeric compositions or by measuring the density profile for opaque polymeric compositions, such as pigmented coating compositions. To visually observe the phase condition of the liquid mixture, a high-pressure sight glass can be installed in the spray apparatus. To measure the density profile, a densitometer, such as a Micromotion densitometer, can be installed in the spray apparatus. Then the phase condition and phase transition can be observed or detected as the spray pressure is lowered and raised.

That the liquid mixture of polymeric composition and compressed fluid forms a liquid compressed fluid phase in the liquid-liquid region can be determined visually for clear or opaque polymeric compositions alike, or by using the clear vehicle of opaque compositions that contain dispersed nonvolatile materials. A liquid compressed fluid phase can be determined to form upon depressurization across the solubility limit pressure, because the lower density of the liquid compressed fluid phase causes the agglomerated droplets to migrate to the top of the mixture and to form a clear inviscid liquid layer when agitation is stopped. Further depressurization to below the bubble point pressure can also be seen to cause the separated liquid phase to vaporize to gas.

Figure 7:
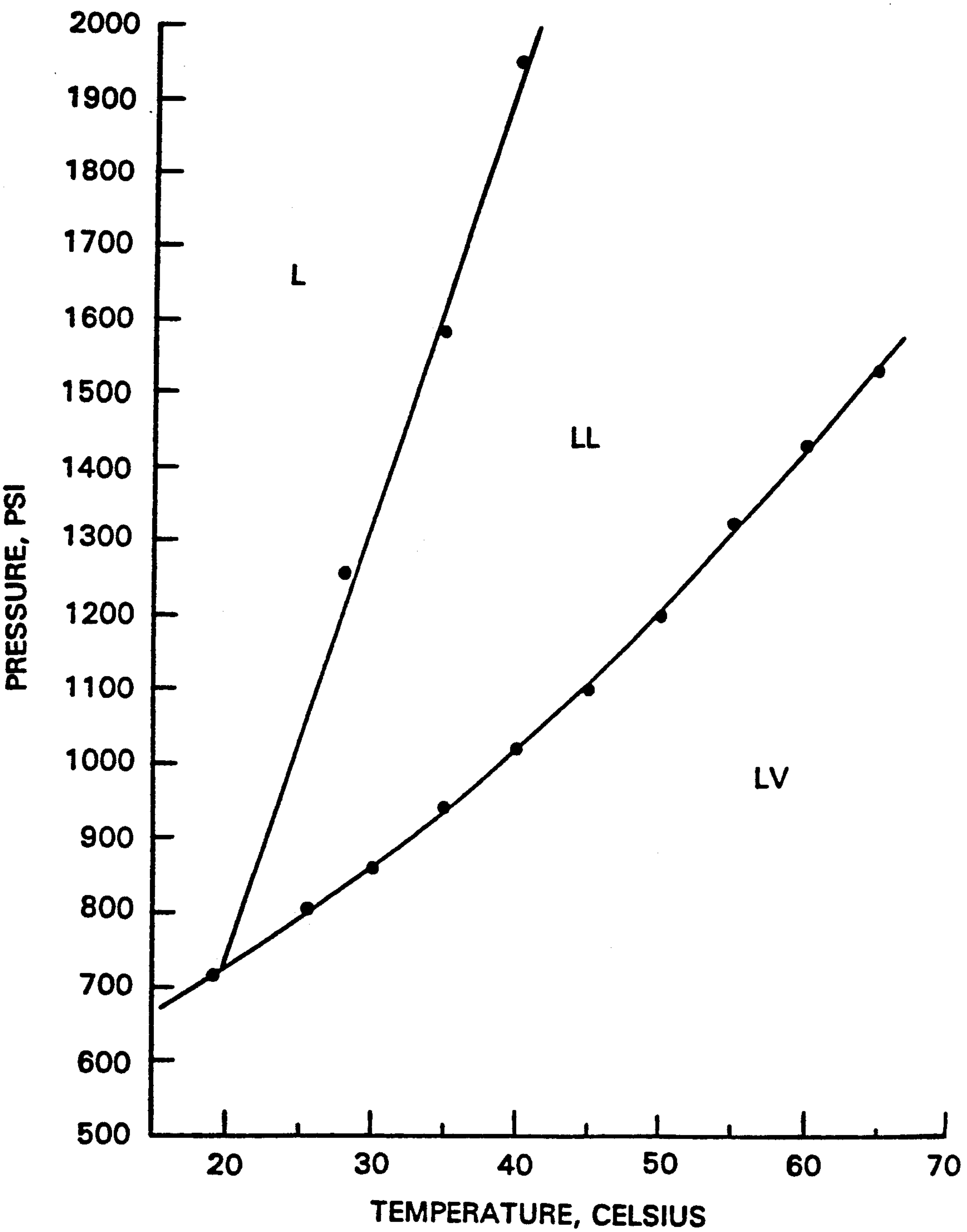
FIG. 7 is a pressure-temperature phase diagram for a polyester polymeric composition illustrating phase relationships at 30% carbon dioxide by weight.

Another temperature-pressure phase diagram for a polymeric composition that is a thermosetting coating concentrate is shown in FIG. 7. It contains polyester and melamine polymers at a polymer level of 67 percent by weight dissolved in a blend of methyl amyl ketone, ethylene glycol butyl acetate ether, and isobutanol solvents. The compressed fluid is carbon dioxide at 30 percent by weight. The liquid-liquid region for this mixture was determined to not contain a liquid carbon dioxide phase. Therefore this system is not in accordance with the present invention. Spraying the mixture with depressurization through the liquid-liquid region did not give enhanced atomization.

In the practice of the present invention, the spray pressure $P_1$ must be above the minimum pressure $P_2$ at which the liquid mixture of polymer composition and compressed fluid forms a liquid compressed fluid phase at temperature $T^0$. Preferably, the spray pressure $P_1$ is above or just below the maximum pressure $P_3$ at which the liquid mixture forms a liquid compressed fluid phase at temperature $T^0$, so that the liquid mixture, before being sprayed, contains little or no liquid compressed fluid phase. Most preferably, the spray pressure $P_1$ is above the maximum pressure $P_3$ at which the liquid mixture forms a liquid compressed fluid phase at temperature $T^0$.

The liquid compressed fluid phase in the liquid-liquid region of the phase diagram has been found to be capable of extracting significant amounts of solvent from the liquid polymeric phase. This can significantly increase the viscosity of the polymeric phase, which can hinder atomization and give poor spray performance. For example, if the polymeric composition is a coating concentrate, the solvent lost by extraction, which evaporates in the atmosphere when sprayed, can significantly increase the viscosity of the deposited coating, which can cause poor coalescence and film formation.

An excessively high spray pressure $P_1$ is not desirable, because the liquid mixture, when sprayed, must depressurize more in the spray orifice before the liquid mixture drops below the solubility limit pressure. Therefore, preferably, the spray pressure $P_1$ is less than about 600 psi above pressure $P_3$, more preferably less than about 300 psi above pressure $P_3$.

Preferably the difference in pressure between the maximum pressure $P_3$ and the minimum pressure $P_2$ at Which the liquid mixture forms a liquid compressed fluid phase at temperature $T^0$ is greater than about 100 psi, more preferably greater than about 200 psi.

The liquid mixture of polymeric composition and compressed fluid may be prepared for spraying by any of the spray apparatus disclosed in the aforementioned related patents or other apparatus. The spray apparatus may also be a UNICARB ® System Supply Unit manufactured by Nordson Corporation to proportion, mix, heat, and pressurize polymeric compositions with compressed fluids such as carbon dioxide for the spray application of coatings.

The liquid mixture is sprayed by passing the mixture at temperature $T^0$ and spray pressure P into an orifice through which the mixture flows to form a liquid spray. An orifice is a hole or an opening in a wall or housing, such as in a spray tip. Spray orifices, spray tips, spray nozzles, and spray guns used for conventional and electrostatic airless and air-assisted airless spraying of coating formulations such as paints, lacquers, enamels, and varnishes, are suitable for spraying the liquid mixtures of the present invention. Spray guns, nozzles, and tips are preferred 1) that do not have excessive flow volume between the orifice and the valve that turns the spray on and off and 2) that do not obstruct the wide angle at which the spray typically exits the spray orifice. The most preferred spray tips and spray guns are the UNICARB ® spray tips and spray guns manufactured by Nordson Corporation. Orifice sizes of from about 0.007-inch to about 0.025-inch nominal diameter are preferred, although smaller and larger orifice sizes may be used. Devices and flow designs, such as pre-orifices or turbulence promoters, that promote turbulent or agitated flow in the liquid mixture prior to passing the mixture through the orifice may also be used. The pre-orifice preferably does not create an excessively large pressure drop in the flow of liquid mixture.

Spray droplets are produced which have an average diameter of one micron or greater, preferably from about 10 to about 100 microns. The optimal spray droplet size will depend upon the requirements of the spray application. For the spray application of coatings, preferably the spray droplets have an average diameter from about 15 to about 80 microns, more preferably from about 20 to about 50 microns.

Preferably, the compressed fluid has appreciable solubility in the polymeric composition. In general, for the compressed fluid to produce sufficient viscosity reduction and to provide a sufficient expansive force for atomization, the compressed fluid, such as carbon dioxide or ethane, should have a solubility in the polymeric composition of at least about 5 weight percent, based upon the total weight of compressed fluid and solvent-borne composition, preferably at least about 10 weight percent, more preferably of at least about 20 weight percent, and most preferably of at least about 25 weight percent.

Although high spray pressures $P_1$ of 5000 psi and higher may be used, preferably the spray pressure $P_1$ is below about 3000 psi, more preferably below about 2000 psi. Very low pressure is generally not compatible with high compressed fluid solubility in the polymeric composition. Therefore, preferably the spray pressure $P_1$ is above about 50 percent of the critical pressure of the compressed fluid, more preferably above about 75 percent of the critical pressure, and most preferably above, at, or slightly below the critical pressure.

Preferably, the spray temperature $T^0$ of the liquid mixture is below about 150° Celsius, more preferably below about 100° Celsius, and most preferably below about 80° Celsius. The temperature level that may by utilized will in general depend upon the stability of the polymeric system. Reactive systems must generally be sprayed at lower temperature than non-reactive systems like air-dry lacquers. Preferably, the spray temperature $T^0$ of the liquid mixture is above about 20°, more preferably above about 25°, and most preferably above, at, or slightly below the critical temperature of the compressed fluid. The liquid mixture is preferably heated to a temperature $T^0$ that substantially compensates for the drop in spray temperature that occurs due to expansion cooling of the decompressing compressed fluid.

The pressure P and temperature $T^0$ used for a given application will depend upon the particular properties of the compressed fluid and the polymeric composition. In particular, they will depend upon the conditions necessary to form a liquid compressed fluid phase upon depressurization. The liquid mixture is preferably sprayed at a temperature $T^0$ and pressure $P_1$ at which the compressed fluid is a supercritical fluid. The spray is preferably a decompressive spray that is feathered and has a parabolic shape.

The polymeric composition preferably has a viscosity of about 500 to about 5000 centipoise (25° Celsius) before admixed with the compressed fluid, more preferably from about 800 to about 3000 centipoise, although higher and lower viscosity may also be used with the present invention, depending upon the requirements of the spray application. For coating applications, the viscosity should be at a level that gives proper coalescence and film formation for a given application.

If a coating is deposited by the spray, the form of the coating and the composition of the substrate are not critical to the present invention. If curing of the polymeric coating composition present upon the coated substrate is required, it may be performed by conventional means, such as allowing for evaporation of solvent, application of heat or ultraviolet light, etc.

Electrostatics may be used to increase the deposition of coating material onto the substrate. This is done by using a high electrical voltage in the range of about 30 to about 150 kilovolts to impart an electrical charge to the liquid mixture or the spray. Any of the methods disclosed in the aforementioned U.S. Pat. No. 5,106,650 may be used in the practice of the present invention.

In general, polymeric coating compositions used in the present invention for coating applications should have a solvent portion containing solvents with the proper balance of evaporation rates so as to ensure proper coating formation and to minimize solvent loss by evaporation in the spray. Based on a relative evaporation rate (RER) to a butyl acetate standard equal to 100 using ASTM Method D3599 at 25° Celsius and one atmosphere pressure, the solvent portion desirably has the following composition of fast and slow evaporating solvents as represented by corresponding RER values:

| Weight Percent of Total Solvent Portion | RER |
|---|---|
| 30-100% | <50 |
| 0-70% | 50-100 |
| 0-40% | 101-250 |
| <10% | >250 |

More preferably, the solvent portion has the following composition:

| Weight Percent of Total Solvent Portion | RER |
|---|---|
| 40-100% | <50 |
| 0-60% | 50-100 |
| 0-30% | 101-250 |
| <5% | >250 |

While preferred forms of the present invention have been described, it should be apparent to those skilled in the art that methods and apparatus may be employed that are different from those shown without departing from the spirit and scope thereof.

EXAMPLE 1

A polymeric coating composition that gives a clear acrylic thermoset coating and has a polymer level of 78.0 percent by weight was prepared from Rohm & Haas Acryloid™ AT-954 resin and American Cyanamid Cymel™ 323 resin. Acryloid™ AT-954 resin contains an acrylic polymer with a weight-average molecular weight of 6,070 at a polymer level of 85 weight percent dissolved in methyl amyl ketone. Cymel™ resin is a melamine polymer cross-linking agent with a weight average molecular weight of 490 at a polymer level of 80 weight percent dissolved in isobutanol. The polymeric composition had the following composition by weight: 59.0% acrylic polymer, 19.0% melamine polymer, 10.4% methyl amyl ketone, 6.4% ethyl 3-ethoxypropionate, 4.8% isobutanol, and 0.4% Silwet® surfactant. The viscosity was about 2000 centipoise. The solvent portion had the following distribution of solvents by relative evaporation rate (RER): 22.0% RER of 74, 48.2% RER of 40, 29.8% RER of 11.

The liquid mixture of polymeric composition and compressed carbon dioxide fluid was prepared and sprayed on a continuous basis by using the proportioning and spraying apparatus disclosed in FIG. 2 of U.S. Pat. No. 5,105,843. Carbon dioxide supplied from a cylinder was pressurized by a pump and regulated to the desired spray pressure $P_1$ by a pressure regulator. A mass flow meter measured the mass flow rate of carbon dioxide fed through a check valve to the mix point with the polymeric composition. The polymeric composition was supplied from a tank, pre-pressurized by a supply pump, and pressurized and metered by a precision gear pump. A gear meter measured the amount delivered through a check valve to the mix point with the carbon dioxide. The speed command of the gear pump was electronically controlled by an input signal from the mass flow meter by using a control system to automatically obtain the desired proportion of polymeric composition and carbon dioxide. The metering rate was electronically adjusted by a feedback signal from the gear meter to correct for pumping inefficiency. The liquid mixture of polymeric composition and carbon dioxide from the mix point was further mixed in static mixer and admixed with recycled liquid mixture in a circulation loop. The circulation loop contained a static mixer, a piston-type accumulator, a heater, a filter, a densitometer, a high-pressure sight glass, a spray gun, a circulation pump, and a second heater. The spray gun was a Nordson A7A automatic airless spray gun with a Binks spray tip #9-0950 with a Spraying Systems tip insert #15153-NY to reduce the void volume in the spray tip. The spray tip had a 9-mil orifice size.

The liquid mixture contained 25 percent carbon dioxide by weight. The phase diagram for this system is shown in FIG. 4.

The liquid mixture was first sprayed at conditions that are not in accordance with the present invention. The spray temperature was 50° Celsius and the spray pressure was 1380 psi. When the liquid mixture was depressurized, the sight glass showed that no liquid-liquid region was formed and that the bubble point pressure was 1270 psi, as shown in FIG. 4. The spray was a feathered, decompressive spray having fine atomization. Spray droplet size was measured by laser diffraction by using a Malvern type 2600 spray and droplet sizer. The Sauter-mean-diameter average droplet size was about 31 microns.

The liquid mixture was then sprayed in accordance with the present invention. The spray temperature T was 65° Celsius and the spray pressure $P_1$ was 1760 psi. When the liquid mixture was depressurized, the sight glass showed that the maximum pressure $P_3$ at which a liquid carbon dioxide phase was formed was 1650 psi and the minimum pressure $P_2$ at which a liquid carbon dioxide phase was formed was 1540 psi, as shown in FIG. 4. The spray was a feathered, decompressive spray having very fine atomization. The average droplet size was reduced to about 23 microns. This enhanced atomization had an average droplet volume that was about 41 percent of the average droplet volume of the first spray. This finer atomization gave higher quality coatings having better appearance and a smoother finish.

EXAMPLE 2

The same polymeric composition, spray unit, spray gun, and spray tip were used as in Example 1.

The liquid mixture contained 30 percent carbon dioxide by weight. It was sprayed in accordance with the present invention at a subcritical temperature. The spray temperature $T^0$ was 30° Celsius and the spray pressure $P_1$ was 1625 psi. When the liquid mixture was depressurized, the sight glass showed that the maximum pressure $P_3$ at which a liquid carbon dioxide phase was formed was 1520 psi and the minimum pressure $P_2$ at which a liquid carbon dioxide phase was formed was 940 psi, as shown in FIG. 4. The spray was a decompressive spray having fine atomization. The average droplet size was about 33 microns.

For one comparison, the liquid mixture was sprayed at conditions not in accordance with the present invention. The carbon dioxide concentration was 25 weight percent. The spray temperature was also 30° Celsius and the spray pressure was 960 psi. When the liquid mixture was depressurized, the sight glass showed that no liquid-liquid region was formed and that the bubble point pressure was about 880 psi, which was just slightly lower than the bubble point pressure at 30 percent carbon dioxide, as shown in FIG. 4. This spray had very poor atomization, having an average droplet size of about 170 microns, despite having nearly the same bubble point pressure at which gaseous nucleation would occur.

For another comparison, another liquid mixture was sprayed, which has a liquid-liquid region at 30 percent carbon dioxide that is similar to that shown in FIG. 4 for the acrylic polymeric composition, that is, the solubility limit pressure curves and the bubble point pressure curves are similar. This second polymeric composition contained a thermosetting polyester polymer that has low molecular weight, like the Acryloid TM AT-954 acrylic polymer, and which also contained Cymel TM 323 resin as a cross-linking polymer. The phase diagram, at 30 percent carbon dioxide, is shown in FIG. 7. The polymer level was 67 percent by weight and the viscosity was about 1000 centipoise. Therefore, because this polymeric composition has lower polymer level and viscosity, it should be more easily atomized than the acrylic composition. However, depressurization of the liquid mixture of the polyester polymeric composition and carbon dioxide, from the liquid region, at a temperature of 30° Celsius and other temperatures, showed that this system is not in accordance with the present invention, because the liquid-liquid region formed does not have a liquid carbon dioxide phase. Therefore, nucleation to liquid carbon dioxide can not occur during depressurization in the spray orifice, and enhanced atomization is not produced. The polyester liquid mixture with 30 percent carbon dioxide was sprayed at a temperature of 30° Celsius and a pressure of about 1600 psi. The atomization was very poor, having an average droplet size of over 150 microns. Enhanced atomization also did not occur at higher temperatures and pressures above the solubility limit curve.

EXAMPLE 3

An acrylic polymeric coating composition was prepared using the same polymers as in Example 1, but at a higher polymer level of 83.6 percent by weight. The polymeric composition had the following composition by weight: 64.1% acrylic polymer, 19.5% melamine polymer, 11.3% methyl amyl ketone, 4.9% isobutanol, and 0.2% Silwet ® surfactant. The viscosity was about 6500 centipoise. The same spray unit, spray gun ,and spray tip were used as in Example 1.

The liquid mixture of acrylic polymeric composition and 23 weight percent carbon dioxide was first sprayed at conditions that are not in accordance with the present invention. The spray temperature was 55° Celsius and the spray pressure was 1700 psi. When the liquid mixture was depressurized, the sight glass showed that no liquid-liquid region was formed and that the bubble point pressure was 1360 psi. The spray was a decompressive spray having an average droplet size of about 57 microns. The spray produced a poor quality coating having poor appearance.

The liquid mixture was then sprayed with 27 weight percent carbon dioxide in accordance with the present invention. The spray temperature $T^0$ was also 55° Celsius and the spray pressure $P_1$ was also 1700 psi. When the liquid mixture was depressurized, the sight glass showed that the maximum pressure $P_3$ at which a liquid carbon dioxide phase was formed was 1530 psi. The spray was a decompressive spray having fine atomization. The average droplet size was reduced to about 34 microns. This enhanced atomization enabled high quality coatings having good appearance and a smooth finish to be sprayed at this higher polymer level with reduced emission of solvent.

EXAMPLE 4

A polymeric coating composition that gives a clear air-dry lacquer coating was prepared by dissolving nitrocellulose and alkyd solid polymers in a blend of methyl amyl ketone and other solvents at a polymer level of about 38 percent by weight. The viscosity was about 850 centipoise. The same spray unit, spray gun, and spray tip were used as in Example 1.

The liquid mixture of polymeric composition and 35 weight percent carbon dioxide was first sprayed at conditions that are not in accordance with the present invention. The spray temperature was 45° Celsius and the spray pressure was 1125 psi. When the liquid mixture was depressurized, the sight glass showed that no liquid-liquid region was formed and that the bubble point pressure was 1030 psi, as shown in FIG. 5. The spray was a decompressive spray having fine atomization. The average droplet size was about 26 microns.

The liquid mixture was then sprayed in accordance with the present invention. The spray temperature T was 65° Celsius and the spray pressure $P_1$ was 1750 psi. When the liquid mixture was depressurized, the sight glass showed that the maximum pressure $P_3$ at which a liquid carbon dioxide phase was formed was 1650 psi and the minimum pressure $P_2$ at which a liquid carbon dioxide phase was formed was 1450 psi, as shown in FIG. 5. The spray was a decompressive spray having very fine atomization. The average droplet size was reduced to about 16 microns. This enhanced atomization had an average droplet volume that was about 23 percent of the average droplet volume of the first spray.

EXAMPLE 5 the same polymeric composition, spray unit, spray gun, and spray tip were used as in Example 4.

The liquid mixture of polymeric composition and 35 weight percent carbon dioxide was first sprayed at conditions that are not in accordance with the present invention. The spray temperature was 35° Celsius and the spray temperature was 965 psi. When the liquid mixture was depressurized, the sight glass showed that no liquid-liquid region was formed and that the bubble point pressure was 870 psi, as shown in FIG. 5. The spray had an average droplet size of about 73 microns. The spray produced a poor quality coating having poor appearance.

The liquid mixture was then sprayed with 43 weight percent carbon dioxide in accordance with the present invention. The spray temperature $T^0$ was also 35° Celsius and the spray pressure $P_1$ was 1600 psi. When the liquid mixture was depressurized, the sight glass showed that the maximum pressure $P_3$ at which a liquid carbon dioxide phase was formed was 1150 psi and the minimum pressure $P_2$ at which a liquid carbon dioxide phase was formed was 930 psi, as shown in FIG. 5. The spray had fine atomization. The average droplet size was reduced to about 28 microns. This enhanced atomization enabled a high quality coating to be sprayed having good appearance and a smooth finish.

EXAMPLE 6

A polymeric coating composition that gives a clear air-dry lacquer coating was prepared by dissolving an acrylic solid polymer in solvent at a polymer level of about 38 percent by weight. The same spray unit, spray gun, and spray tip were used as in Example 1.

The liquid mixture of polymeric composition and 45 weight percent carbon dioxide was first sprayed at conditions that are not in accordance with the present invention. The spray temperature was 40° Celsius and the spray pressure was 1050 psi. When the liquid mixture was depressurized, the sight glass showed that no liquid-liquid region was formed and that the bubble point pressure was 950 psi. The spray had an average droplet size of about 86 microns.

The liquid mixture was then sprayed in accordance with the present invention at the same carbon dioxide concentration. The spray temperature $T^0$ was about 55° Celsius and the spray pressure $P_1$ was about 1475 psi. When the liquid mixture was depressurized, the sight glass showed that the maximum pressure $p_3$ at which a liquid carbon dioxide phase was formed was 1375 psi and the minimum pressure $P_2$ at which a liquid carbon dioxide phase was formed was 1225 psi. The average droplet size of the spray was reduced to about 54 microns.

What is claimed is:

1. A process for spraying a polymeric composition to form a spray of finely atomized liquid droplets, which comprises:
   (1) forming a liquid mixture at temperature $T^0$ in a closed system, said mixture comprising:
      (a) a nonvolatile materials fraction containing at least one polymeric compound and which is capable of being sprayed; and
      (b) a solvent fraction which is at least partially miscible wit the nonvolatile materials fraction and contains at least one compressed fluid in an amount which when added to (a) is sufficient:
         (i) to render the viscosity of said mixture to a point suitable for being sprayed; and
         (ii) to enable said liquid mixture to form a liquid compressed fluid phase at temperature $T^0$; wherein the compressed fluid is a gas at standard conditions of 0° C. and one atmosphere pressure (STP); and
   (2) spraying said liquid mixture by passing the mixture at temperature $T^0$ and spray pressure $P_1$ into an orifice through which said mixture flows to form a liquid spray, wherein spray pressure $P_1$ is above the minimum pressure $p_2$ at which said liquid mixture forms a liquid compressed fluid phase at temperature $T^0$, thereby passing the liquid mixture through the liquid-liquid region of the polymeric composition and compressed fluid during depressurization.

2. The process of claim 1, wherein said spray pressure $P_1$ is above or just below the maximum pressure $P_3$ at which said mixture forms a liquid compressed fluid phase at temperature $T^0$.

3. The process of claim 2, wherein said spray pressure P is less than about 600 psi above said pressure $P_3$.

4. The process of claim 1, wherein the viscosity of the liquid mixture of (a) and (b) is less than about 200 centipoise.

5. The process of claim 1, wherein the solvent fraction contains at least one active solvent for the polymeric compound.

6. The process of claim 1, wherein the compressed fluid is a supercritical fluid at temperature $T^0$ and spray pressure $P_1$.

7. The process of claim 1, wherein the compressed fluid is carbon dioxide, nitrous oxide, ethane, or a mixture thereof.

8. A process for the spray application of polymeric coating compositions to a substrate, which comprises:
   (1) forming a liquid mixture at temperature $T^0$ in a closed system, said mixture comprising:
   (a) a nonvolatile materials fraction containing at least one polymeric compound capable of forming a coating on a substrate; and
   (b) a solvent fraction which is at least partially miscible with the nonvolatile materials fraction and contains at least one compressed fluid in an amount which when added to (a) is sufficient:
      (i) to render the viscosity of said mixture to a point suitable for being sprayed; and
      (ii) to enable said liquid mixture to form a liquid compressed fluid phase at temperature $T^0$; wherein the compressed fluid is a gas at standard conditions of 0° C. and one atmosphere pressure (STP); and
   (2) spraying said liquid mixture onto a substrate to form a coating thereon by passing the mixture at temperature $T^0$ and spray pressure $P_1$ into an orifice through which said mixture flows to form a liquid spray, wherein spray pressure $P_1$ is above the minimum pressure $P_2$ at which said liquid mixture forms a liquid compressed fluid phase at temperature $T^0$, thereby passing the liquid mixture through the liquid-liquid region of the liquid mixture of the polymeric composition and compressed fluid during depressurization.

9. The process of claim 8, wherein said spray pressure $P_1$ is above or just below the maximum pressure $P_3$ at which said mixture forms a liquid compressed fluid phase at temperature $T^0$.

10. The process of claim 9, wherein said spray pressure $P_1$ is less than about 600 psi above said pressure $P_3$.

11. The process of claim 8, wherein the viscosity of the liquid mixture of (a) and (b) is less than about 200 centipoise.

12. The process of claim 8, wherein the solvent fraction contains at least one active solvent for the polymeric compound.

13. The process of claim 8, wherein the compressed fluid is a supercritical fluid at temperature $T^0$ and spray pressure $P_1$.

14. The process of claim 8, wherein the compressed fluid is carbon dioxide, nitrous oxide, ethane, or a mixture thereof.

15. The process of claim 8, wherein the at least one polymeric compound is selected from the group consisting of thermoplastic polymers, thermosetting polymers, crosslinkable film forming systems, and mixtures thereof.

16. The process of claim 15, wherein the at least one polymeric compound is selected from the group consisting of enamels, varnished, lacquers, acrylic polymers, vinyl polymers, styrenic polymers, polyesters, alkyds, polyurethanes, two-package polyurethanes, epoxy systems, phenolic systems, cellulosic polymers, amino polymers, silicone polymers, polymers containing fluorine, and mixtures thereof.

17. The process of claim 8, wherein the spray is a feathered, decompressive spray.

18. The process of claim 8, wherein the liquid mixture or spray is electrically charged by a high electrical voltage.

19. The process of claim 1, wherein the polymeric coating composition has a solvent portion composition of:

| Weight Percent of Total Solvent Portion | RER |
|---|---|
| 30-100% | <50 |
| 0-70% | 50-100 |
| 0-40% | 101-250 |
| <10% | >250 |

20. The process of claim 19, wherein the polymeric coating composition has a solvent portion composition of:

| Weight Percent of Total Solvent Portion | RER |
|---|---|
| 40-100% | <50 |
| 0-60% | 50-100 |
| 0-30% | 101-250 |
| <5% | >250 |

* * * * *